United States Patent
Di Lallo et al.

(10) Patent No.: US 12,301,674 B2
(45) Date of Patent: May 13, 2025

(54) EDGE-CLOUD APPLICATION CONTEXT MIGRATION

(71) Applicant: InterDigital Patent Holdings, Inc., Wilmington, DE (US)

(72) Inventors: Kevin Di Lallo, Laval (CA); Michel Roy, Candiac (CA); Michael Starsinic, Newtown, PA (US); Taimoor Abbas, Sainte-Julie (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/750,615

(22) Filed: Jun. 21, 2024

(65) Prior Publication Data

US 2024/0348692 A1    Oct. 17, 2024

Related U.S. Application Data

(63) Continuation of application No. PCT/US2024/022960, filed on Apr. 4, 2024.

(60) Provisional application No. 63/457,956, filed on Apr. 7, 2023.

(51) Int. Cl.
  *H04L 67/141* (2022.01)
  *H04L 61/4511* (2022.01)
  *H04W 76/10* (2018.01)

(52) U.S. Cl.
  CPC ........ *H04L 67/141* (2013.01); *H04L 61/4511* (2022.05); *H04W 76/10* (2018.02)

(58) Field of Classification Search
  None
  See application file for complete search history.

(56) References Cited

U.S. PATENT DOCUMENTS

| | | | |
|---|---|---|---|
| 2021/0307018 A1* | 9/2021 | Qaisrani | H04W 72/54 |
| 2022/0015018 A1* | 1/2022 | Kim | H04W 48/16 |
| 2022/0030063 A1* | 1/2022 | Gupta | H04W 4/50 |

(Continued)

FOREIGN PATENT DOCUMENTS

WO    WO 2023/027477 A1    3/2020

OTHER PUBLICATIONS

3rd Generation Partnership Project; "Technical Specification Group Services and System Aspects; Architecture for enabling Edge Applications; (Release 18)", 3GPP TS 23.558 V18.1.0, Dec. 2022, 195 pages.

(Continued)

*Primary Examiner* — Mohamed Ibrahim
(74) *Attorney, Agent, or Firm* — Flaster Greenberg P.C.

(57) ABSTRACT

A wireless transmit receive unit (WTRU) may be configured to perform an edge application server (EAS) discovery procedure for a user session. The WTRU may be configured to determine, based on the EAS discovery procedure, that there are no available target EAS (T-EAS) instances for the user session. The WTRU may be configured to determine whether the user session supports application context relocation (ACR) to a cloud application server (CAS) using ACR configuration information (ACI). The WTRU may be configured to establish a connection with the CAS based on the ACI. The WTRU may be configured to send a notification to one or more ACR entities indicating that ACR to the CAS has been initiated. The WTRU may be configured to obtain CAS details using the ACI.

20 Claims, 10 Drawing Sheets

(56) References Cited

U.S. PATENT DOCUMENTS

2022/0191090 A1\* 6/2022 Lee .................... H04L 41/0806
2023/0239215 A1\* 7/2023 Kim ....................... H04L 41/12
709/223

OTHER PUBLICATIONS

3rd Generation Partnership Project; "Technical Specification Group Services and System Aspects; Study on enhanced Architecture for enabling Edge Applications; (Release 18)", 3GPP TR 23.700-98 V18.0.0, Dec. 12, 2022, 247 pages.

$3^{rd}$ Generation Partnership Project; "Pseudo-CR on concluding KI#11", Samsung, KPN, S6-223060, (revision of S6-223024, S6-222779); 3GPP TSG-SA WG6 Meeting #51-e, e-meeting, Oct. 10-19, 2022, 6 pages.

\* cited by examiner

EDGE-CLOUD APPLICATION CONTEXT MIGRATION

CROSS-REFERENCE TO RELATED APPLICATIONS

This application is a continuation of International Application No. PCT/US2024/022960, filed Apr. 4, 2024, which claims the benefit of U.S. Provisional Patent Application No. 63/457,956 filed on Apr. 7, 2023, the contents of which is incorporated herein by reference in its entirety.

BACKGROUND

An application layer may be used to support edge services. An Application Client (AC) may be a user application residing on a WTRU that communicates with an EAS. A WTRU may use one or more (e.g., several) AC concurrently.

An Edge Application Server (EAS) may be an application server resident in an Edge Data Network (EDN). EAS may be a software server executing on generic hardware located at the edge and/or providing a service to the AC. In the context of a mobility and/or relocation example, the Source-EAS (S-EAS) may be an instance of an EAS in an initial location and/or serving the AC (e.g., before mobility/relocation happens). The Target-EAS (T-EAS) may be an instance of an EAS in a destination location and/or serving the AC (e.g., after mobility and/or relocation has happened). There can be one or more (e.g., multiple) EAS instances per EDN. One or more (e.g., each) EDN may include a different set of EAS instances of different types (e.g., different EASID). An EAS may serve one or more AC instances that may reside on different WTRUs.

An Edge Enabler Client (EEC) may provide edge support to the one or more AC instances on the WTRU. There can be one or more EEC per WTRU. One or more (e.g., each) AC may use (e.g., only) one EEC.

An Edge Enabler Server (EES) may provide one or more supporting functions included by EAS and/or EEC. In the context of a mobility and/or relocation example, the Source-EES (S-EES) may be the EES used before mobility and/or relocation happens, and/or the Target-EES (T-EES) may be the EES used after mobility/relocation has happened. There can be one or more EES instances per EDN (e.g., or per DNN). There can be one or more (e.g., multiple) EDN instances in the network.

An Edge Configuration Server (ECS) may provide one or more supporting functions for an EEC and/or EES to discover one or more EES instances providing certain EAS. There can be one or more ECS for the network.

A Notification Management Client (NMC) may provide one or more supporting functions for an EEC to create a notification channel between the NMC and the Notification Management Server (NMS) to receive one or more notifications from the ECS and/or EES. One or more (e.g., each) EEC may use (e.g., only) one NMC.

One or more service continuity procedures may be included in the EEL for transferring an application context from a S-EAS to a T-EAS. The context transfer may be triggered, for example, by WTRU movement, as well as one or more non-mobility events (e.g., EAS server maintenance, overload, etc.). A purpose of service continuity may be to minimize edge service interruption to the ACs executing on the WTRU.

Service continuity for applications that include context relocation may be specified by the EEL in one or more (e.g., five) different application context relocation (ACR) scenarios. The one or more (e.g., each) scenario may include one or more (e.g., four) different phases: detection, decision, execution, and/or post-execution. One or more ACR scenarios may specify one or more different EEL entities (e.g., EEC, EES, EAS) for the detection and/or determination (e.g., decision) phases (e.g., a detection entity and/or a decision-making entity), and/or one or more different sets of interactions between one or more EEL entities for the execution phase.

A user session may be represented by a logical connection between an AC of a WTRU and an application server (AS) of an edge node (e.g., EAS) and/or an AS of a cloud node (e.g., CAS). Application data may be exchanged between the AC and the AS over the logical connection. An AC and/or EEC of a WTRU may use one or more services from the edge enablement layer (EEL) to discover the one or more EDNs where the edge services are available, may establish connectivity with the one or more EDNs, may discover one or more EAS instances within an EDN, may select one or more EAS instances and/or may configure one or more EEL parameters (e.g., ACR, traffic influence, etc.) related to the user session between the AC and the one or more EASs. The AC may connect and/or start exchanging user application data with the selected EAS.

SUMMARY

Systems, methods, and apparatuses are described herein to enable application context migration between edge application servers (EAS) and cloud application servers (CAS). Cloud relocation information (CRI) may include the application layer service continuity capabilities, requirements, and/or information included by the Edge Enabler Client (EEC) and/or EAS for Application Context Relocation (ACR) scenario selection. ACR configuration information (ACI) may include the ACR detection and/or execution configuration (e.g., derived from the CRI) needed by the EEC and/or Edge Enabler Server (EES) and/or EAS for detection and/or execution of ACR for cloud. Procedures described herein may include functionality for provisioning CRI from the application layer to the EEC and/or EES, for selecting ACR scenarios using the CRI, and/or for distributing ACI to the ACR detection and/or execution entities (e.g., EEC and/or EES and/or EAS). Procedures described herein may include functionality for configuring ACR detection and/or ACR execution in the EEC and/or EES and/or EAS to detect a need for ACR to a CAS and/or to migrate the application context to the CAS.

Systems, methods, and apparatuses are described herein with respect to (e.g., Edge-Cloud) Application Context Relocation scenario selection based on application client (AC) provided cloud relocation information (CRI).

A wireless transmit receive unit (WTRU) may be configured to perform an EAS discovery procedure for a user session. The WTRU may be configured to determine, based on the EAS discovery procedure, that there are no available target EAS (T-EAS) instances for the user session. The WTRU may be configured to determine whether the user session supports ACR to a CAS using ACI. The WTRU may be configured to establish a connection with the CAS based on the ACI. The WTRU may be configured to send a notification to one or more ACR entities indicating that ACR to the CAS has been initiated.

The WTRU may be configured to obtain CAS details using the ACI. The WTRU may be configured to initiate transfer of a user session context from an EAS to the CAS based on the ACI. The WTRU may be configured to perform DNS resolution for the CAS based on the ACI. The WTRU may be configured to determine that the there are no available T-EAS instances for the user session based on one or more of an ACR trigger in the ACI or the WTRU moving to a location where no T-EAS instances meet requirements associated with the user session. A change in location of the WTRU triggers a need to change EAS. The ACI may include CRI that indicates CAS information, application layer capabilities, or application layer requirements, and wherein the CAS information comprises an internet protocol (IP) address, Fully Qualified Domain Name (FQDN), Universal Resource Identifier (URI), Data Network Name (DNN), Data Network Access Identifier (DNAI), or Single-Network Slice Selection Assistance Information (S-NSSAI) to reach the CAS.

DETAILED DESCRIPTION

Figure 1A:
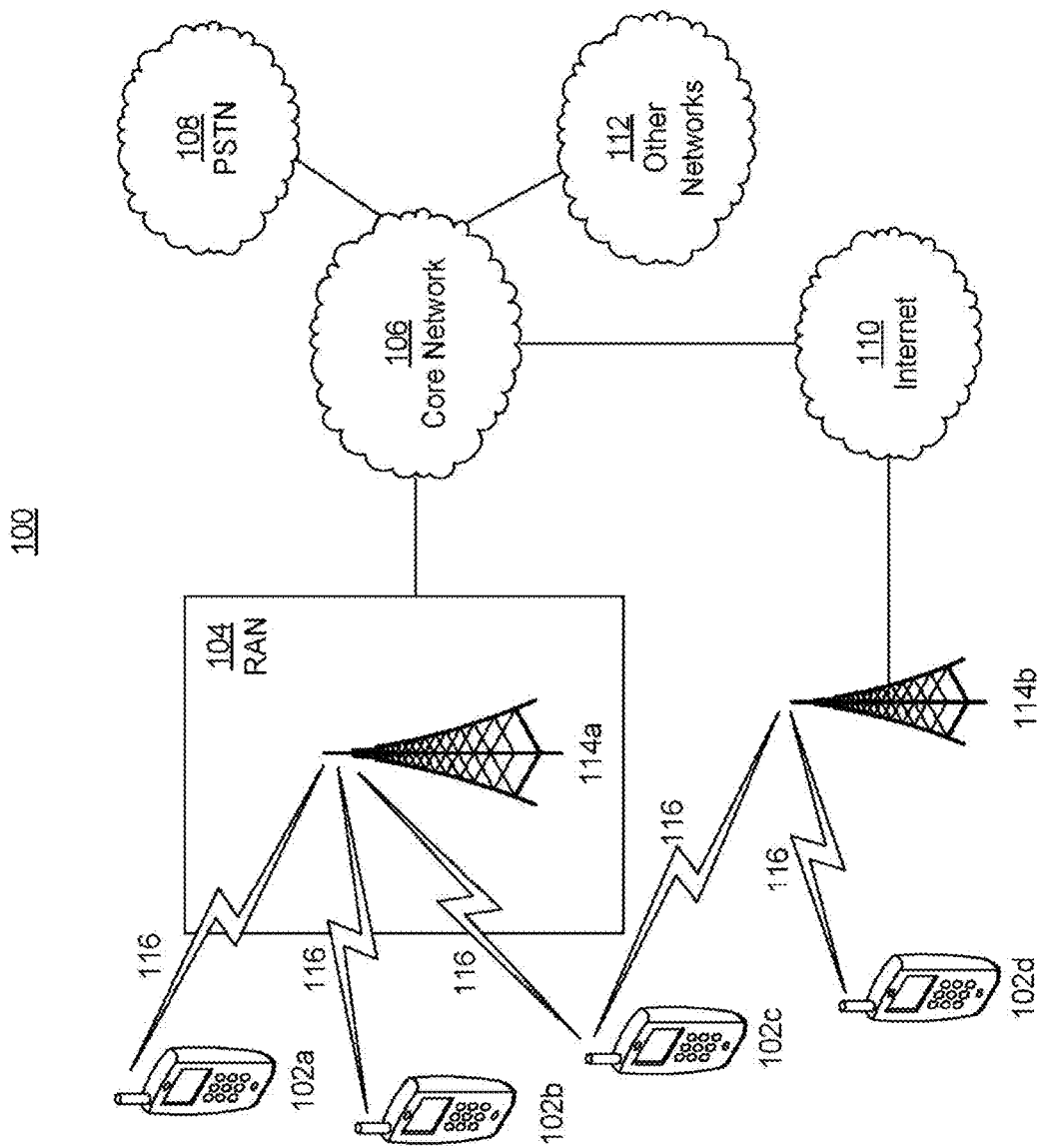
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
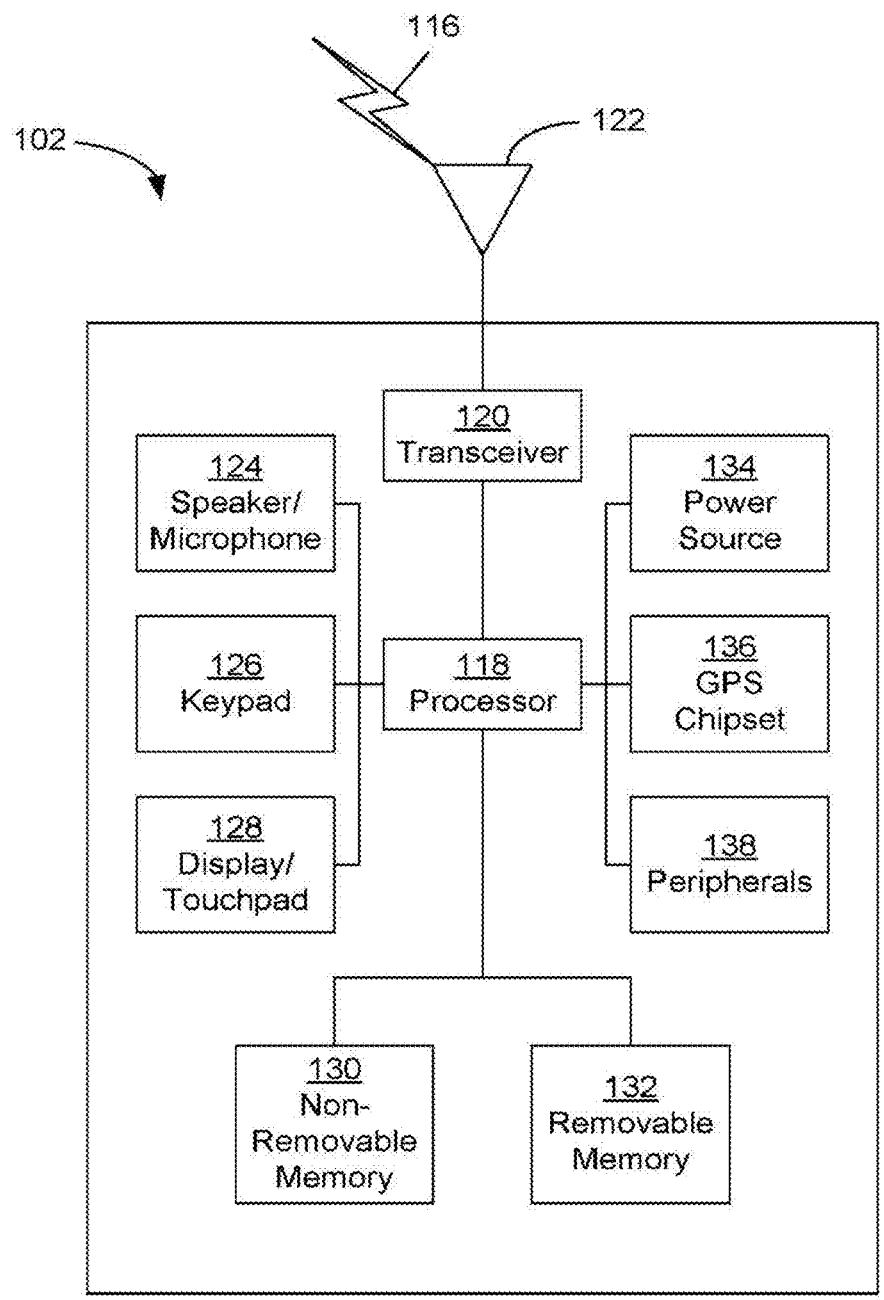
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
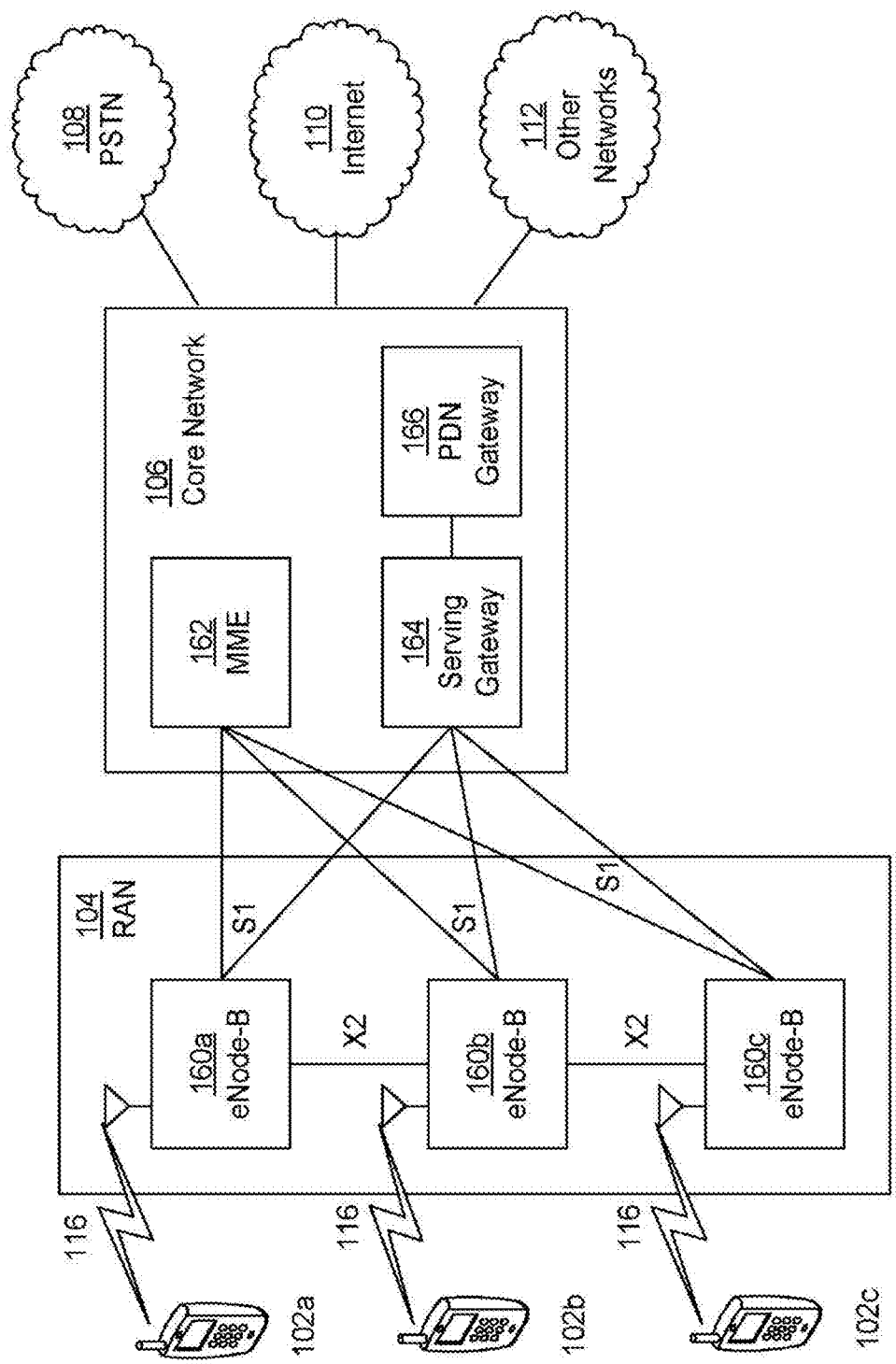
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHZ channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
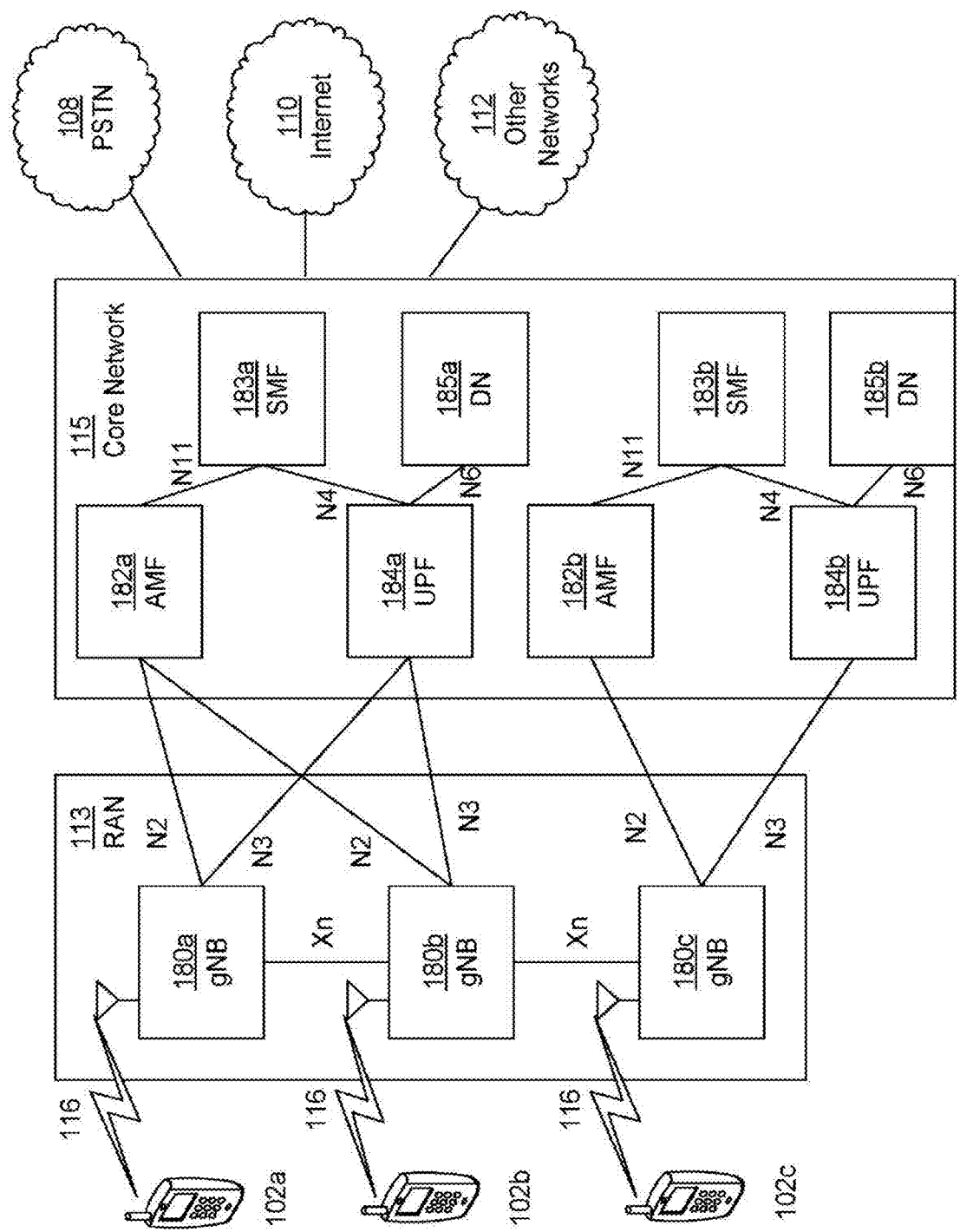
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The terms ACR Scenario and ACR Procedure may be used interchangeably, as described herein.

A WTRU may be configured to perform application layer for supporting one or more edge services.

Figure 2:
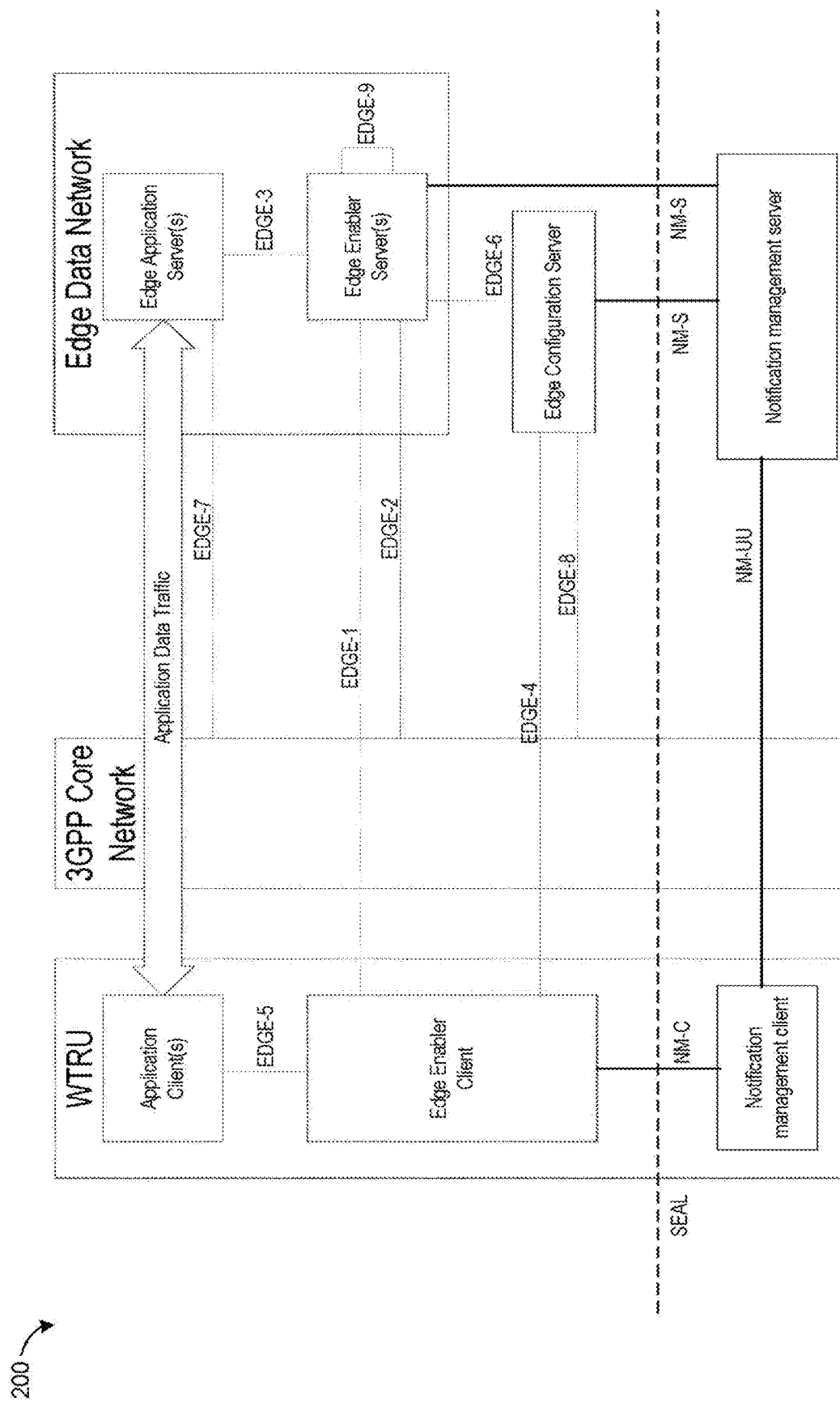
FIG. 2 illustrates a system diagram of an example Architecture for enabling edge application(s).

FIG. 2 illustrates a system diagram of an example architecture 200 (e.g., high-level architecture) for enabling edge applications. One or more components of the architecture are described herein.

An Application Client (AC) may be a user application residing on a WTRU that communicates with an EAS. A WTRU may use one or more (e.g., several) AC concurrently.

An Edge Application Server (EAS) may be an application server resident in an Edge Data Network (EDN). EAS may be a software server executing on generic hardware located at the edge and/or providing a service to the AC. In the context of a mobility and/or relocation example, the Source-EAS (S-EAS) may be an instance of an EAS in an initial location and/or serving the AC (e.g., before mobility/relocation happens). The Target-EAS (T-EAS) may be an instance of an EAS in a destination location and/or serving the AC (e.g., after mobility and/or relocation has happened). There can be one or more (e.g., multiple) EAS instances per EDN. One or more (e.g., each) EDN may include a different set of EAS instances of different types (e.g., different EASID). An EAS may serve one or more AC instances that may reside on different WTRUS.

An Edge Enabler Client (EEC) may provide edge support to the one or more AC instances on the WTRU. There can be one or more EEC per WTRU. One or more (e.g., each) AC may use (e.g., only) one EEC.

An Edge Enabler Server (EES) may provide one or more supporting functions included by EAS and/or EEC. In the context of a mobility and/or relocation example, the Source-EES (S-EES) may be the EES used before mobility and/or relocation happens, and/or the Target-EES (T-EES) may be the EES used after mobility/relocation has happened. There can be one or more EES instances per EDN (e.g., or per DNN). There can be one or more (e.g., multiple) EDN instances in the network.

An Edge Configuration Server (ECS) may provide one or more supporting functions for an EEC and/or EES to discover one or more EES instances providing certain EAS. There can be one or more ECS for the network.

A Notification Management Client (NMC) may provide one or more supporting functions for an EEC to create a notification channel between the NMC and the Notification Management Server (NMS) to receive one or more notifications from the ECS and/or EES. One or more (e.g., each) EEC may use (e.g., only) one NMC.

A Notification Management Server (NMS) may provide one or more supporting functions for an ECS and/or EES to send one or more notifications to an EEC via a notification channel created between the NMC and the NMS. There can be one or more NMS for the network.

Systems, methods, and apparatuses described herein may provide service continuity. One or more service continuity procedures may be included in the EEL for transferring an application context from a S-EAS to a T-EAS. The context transfer may be triggered, for example, by WTRU movement, as well as one or more non-mobility events (e.g., EAS server maintenance, overload, etc.). Service continuity may reduce and/or minimize edge service interruption to the ACs executing on the WTRU.

Service continuity for applications that include context relocation may be specified by the EEL in one or more (e.g., five) different application context relocation (ACR) scenarios. The one or more (e.g., each) scenario may include one or more (e.g., four) different phases: detection, decision, execution, and/or post-execution. One or more ACR scenarios may specify one or more different EEL entity(ies) (e.g., EEC, EES, EAS) for the detection and/or determination (e.g., decision) phases (e.g., a detection entity and/or a decision-making entity), and/or one or more different sets of interactions between one or more EEL entities for the execution phase.

Figure 3:
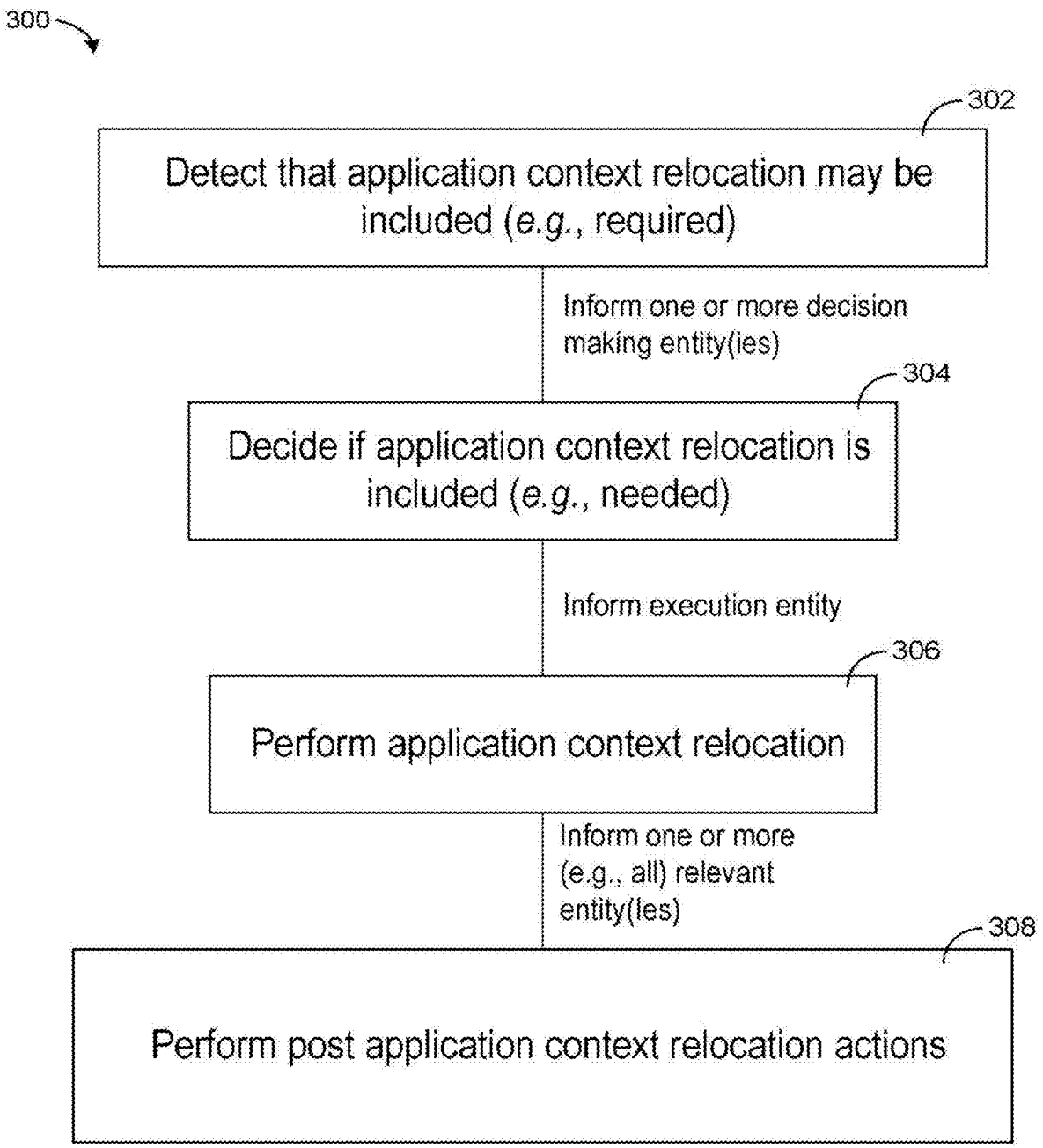
FIG. 3 illustrates an example high level overview of application context relocation (ACR).

FIG. 3 provides a high-level overview of an example ACR procedure 300. A detection entity may monitor WTRU location and/or movement and/or may inform the decision-making entity. The decision-making entity may determine if an ACR is included (e.g., required) and/or may command the execution entity to perform ACR. The execution entity may run the one or more ACR procedures, as described herein (e.g., described in the service continuity scenarios) to transfer the application context from the S-EAS to the T-EAS. When ACR execution is complete, for example, ACR cleanup may be performed. For example, at 302, a detection entity (e.g., such as an EEC, an EES, or an EAS) may detect that ACR may be required. The detection entity may inform one or more decision-making entities (e.g., such as an EEC, an EES, or an EAS) that ACR is required. At 304, for example, the decision-making entity may decide if ACR is needed, for example, based on being informed by a detection entity. At 306, the execution entities (e.g., such as an EEC, an EES, or an EAS) may perform ACR. At 308, the execution entity may perform one or more post ACR actions, as described herein.

Systems, methods, and apparatuses described herein may be with respect to user session. A user session may be represented by a logical connection between an AC of a WTRU and an application server (AS) of an edge node (e.g., such as an EAS) and/or an AS of a cloud node (e.g., such as a CAS). Application data may be exchanged between the AC and the AS over the logical connection. An AC and/or EEC of a WTRU may use one or more services from the edge enablement layer (EEL) to discover the one or more EDNs where the edge services are available, may establish connectivity with the one or more EDNs, may discover one or more EAS instances within an EDN, may select one or more EAS instances and/or may configure one or more EEL parameters (e.g., ACR, traffic influence, etc.) related to the user session between the AC and the one or more EASs. The AC may connect and/or start exchanging user application data with the selected EAS.

An edge enablement service layer may support application context relocation between one or more edge application servers. One or more system enhancements may provide application service in one or more areas where edge coverage is not available. One or more enhancements may include support for service continuity for ACs while switching between edge and cloud application servers (CAS).

In order to migrate an application context from an EAS to a CAS, the EEC and/or S-EES may know if the CAS is supported and/or the EEC and/or S-EES may have CAS information (e.g., IP address, FQDN, URI, DN information) to perform the migration. For one or more ACR scenarios where the AC and/or S-EAS select the target application server, the AC and/or S-EAS may have pre-configured CAS capability and/or information. The AC and/or S-EAS may use the pre-configured CAS information when initiating ACR to the CAS. For one or more ACR scenarios where the EEC and/or S-EES select the target application server, the EEC and/or S-EES may not have CAS capabilities nor CAS information for initiating ACR to the CAS. For example, one or more (e.g., certain) ACR procedures may not support service continuity from an EAS to CAS. The EEC and/or S-EES may have no CAS capability nor CAS information for selecting ACR scenarios according to CAS requirements and/or initiating ACR to the CAS.

Application context migration to a CAS may be triggered when there is no edge coverage (e.g., EAS discovery may find no available EES and/or EAS). CAS migration may not be allowed in some applications (e.g., such as edge-native applications). Additionally or alternatively, CAS migration may be triggered based on one or more factors (e.g., service agreements, cost, etc.) that differ from the existing ACR detection and/or decision criteria. The EEL may be unaware of these one or more application layer constraints for application context migration between edge and cloud. For example, one or more ACR procedures between edge and cloud may be unaware of constraints related to migrating an edge application context to the cloud and/or may not detect if such constraints are present.

One or more system procedures for migrating edge application context from one EAS to a second EAS may not be applied when migrating edge application context from one EAS to a CAS. One or more system procedures may not be sufficient because the system procedure(s) do not enable the detection, and/or discovery of one or more available cloud servers and/or may not allow the detection of one or more events that would trigger migration to a cloud server.

Systems, methods, and apparatuses described herein are with respect to supporting application context migration between edge and cloud application servers (e.g., one or more enhancements to 3GPP EEL). A cloud application server (CAS) may refer to an application server deployed in a data network (DN) that is different from an edge data network (EDN) where edge application servers (EAS) are deployed. Migrating context between a CAS and an EAS may involve migration from a first DN to a second DN. Provisioning of application layer service continuity capabilities, requirements and/or information in the EEC and/or EES may be provided. The EEC and/or EES may use the provisioned information to select ACR scenarios for a user session and/or to configure one or more ACR detection triggers and/or ACR execution behavior to enable application context migration between edge and one or more cloud application servers.

Systems, methods, and apparatuses are described herein with respect to cloud relocation information (CRI). One or more EEL service continuity capabilities, requirements, and/or information may be provided by the application layer, for example, to enable ACR scenario selection and/or configuration for context migration from an EAS to a CAS. ACR configuration information (ACI) may be derived from the CRI. The ACI may be used to configure ACR detection and/or execution for migration from an EAS to a CAS.

Systems, methods, and apparatuses may be configured with respect to selection of one or more Application Context Relocation (ACR) procedures for cloud. One or more problems may be addressed with respect to one or more Edge Enablement Layer (EEL) participants (e.g., Edge Enabler Client (EEC), Edge Enabler Server (EES), Edge Application Server (EAS), and/or Edge Configuration Server (ECS)) may not have the proper (e.g., required) information to determine if Application Context Relocation (ACR) with the cloud is possible and/or how ACR may be executed. When transitioning to a target Edge Data Network (EDN), for example, this information may be provided by one or more EEL participants. When transitioning to the cloud, information may be missing (e.g., when may an application context be transferred to the cloud, how are one or more available cloud application servers discovered, under which circumstance(s) may an ACR be performed to the cloud, what ACR procedure(s) may be used to support ACR to the cloud, etc.). Systems, methods, and apparatuses described herein are with respect to provisioning of cloud relocation information (CRI) in one or more EEL participants and/or deriving and/or determining (e.g., deciding) "ACR configuration".

A WTRU (e.g., such as an EEC) may determine an ACR configuration for cloud relocation. The WTRU may determine Cloud Relocation Information (CRI). The CRI may be pre-configured at the EEC and/or may be provided by an AC. The CRI may indicate a cloud migration capability of the AC, information about one or more cloud servers, one or more conditions for relocating to the cloud, and/or configuration information for one or more ACR procedures. On a condition that the cloud migration capability indicated by the CRI indicates that the AC is capable of migrating to a cloud application server, the WTRU may perform one or more of the following. The WTRU may send a service provisioning request to an ECS. The service provisioning request may include CRI, for example, the determined CRI (e.g., if it was obtained by the EEC). The WTRU may receive a service provisioning response from the ECS. The service provisioning response may include one or more EES instances capable of supporting cloud relocation. The WTRU may send an EAS discovery request to an EES. The EAS discovery request may include the determined CRI (e.g., if it was obtained by the EEC). The WTRU may receive an EAS discovery response from the EES. The EAS discovery response may include one or more EAS instances that are capable of supporting cloud relocation. The EAS discovery response may include the determined CRI (e.g., if it was obtained by the EES). For example, the EAS discovery response may include the determined CRI if the EEC does not have pre-provisioned CRI or has not received CRI from the AC (e.g., the EEC may receive the CRI from the EES in the EAS discovery procedure).

The WTRU may select an EAS instance and/or one or more ACR scenarios, for example, based on the cloud migration capability. The WTRU may determine ACR Configuration Information (ACI) based on one or more ACR capabilities of the Application Client (AC), one or more ACR capabilities of the EEC, one or more ACR capabilities of the EES, one or more ACR capabilities of the EAS, and/or the determined CRI. The WTRU may send an EAS information provisioning request to the EES. The EAS information provisioning request may include the selected EAS instance, one or more ACR scenarios, and/or the determined ACI. The WTRU may receive an EAS information provisioning response from the EES. The EAS information provisioning response may include an indication that the selected EAS instance, one or more ACR scenarios, and/or the determined ACI has been accepted. The WTRU may initiate ACR detection processing based on the determined ACI.

Additionally or alternatively, the EES may receive CRI from the EAS. The EES may provide the CRI to the EEC (e.g., as shown FIG. 5). When the EES receives the CRI from the EAS, the EEC may delegate ACR scenario selection to the EES. For example, the EES may determine ACI when the EEC delegates ACR scenario selection to the EES.

One or more EEL service continuity capabilities may include an indication that service continuity is required, a list of supported ACR scenarios, and/or a list of preferred ACR scenarios. The EEL service continuity capabilities may be provided by the AC, EAS, EEC, and/or EES. The service continuity capabilities may be used during ACR scenario selection to determine one or more ACR procedures that may be used for service continuity of a user session between an AC and an EAS.

To enable application context migration between edge and one or more cloud application servers, one or more enhancements to service continuity capabilities, and/or one or more enhancements to one or more ACR management procedures (e.g., ACR scenario selection and/or ACR execution) may be provided.

The one or more service continuity capability(ies) provided by the application layer may be enhanced with cloud relocation information (CRI). CRI may include CAS information for CAS discovery and/or user session establishment with a CAS (e.g., an IP address, FQDN, URI, DNN, DNAI, SNSSAI to reach a cloud application server). Additionally or alternatively, CRI may include one or more application layer capabilities and/or requirements for application context migration between edge and one or more cloud application servers. For example, CRI may include whether an application can be transferred to the cloud, one or more Key Performance Indicators (KPIs) requirements for transferring to the cloud, one or more service areas for transferring to the cloud, one or more edge service SLA thresholds (e.g., edge usage limits) for transferring to the cloud, a time for transferring to the cloud, a supported cloud service provider, a supported application service provider, a CAS provisioning mode for specifying how the EEL may obtain CAS information (e.g., application layer-provided, and/or EEL-determined), and/or one or more other requirements.

CAS information may be provisioned in the EEL to inform the EEC and/or EES about CAS connectivity. CAS information may be used in the EEL to inform the EEC and/or EES how to obtain additional CAS information, for example, the CAS endpoint (e.g., IP address, FQDN, URI, etc.).

One or more CRI capabilities and/or requirements may be provisioned in the EEL to inform the EEC and/or EES about the application layer capabilities and/or requirements for application context migration between edge and one or more cloud application servers. One or more CRI capabilities and/or requirements may be used by the EEC and/or EES to select one or more ACR scenarios compatible with cloud migration. One or more CRI capabilities and/or requirements may be used by the EEC and/or the EES to derive and/or configure ACR detection and/or one or more ACR execution rules in the EEC, EES, and/or EAS.

The EEC and/or EES may use the provisioned CRI to derive ACR configuration information (ACI). ACI may include a configuration for the selected ACR scenario(s). The configuration may include an ACR detection configuration for triggering migration to cloud, an ACR execution configuration, and/or (e.g., any) information from the CRI. The ACR detection configuration may include ACR detection priority and/or detection trigger criteria such as edge service KPI thresholds, SLA thresholds (e.g., edge usage limits), time, and/or edge and/or cloud service areas. The ACR execution configuration may include one or more actions to take when no T-EAS is available during ACR, one or more actions to take when ACR is triggered by detection criteria from the ACR detection configuration (e.g., ignore discovered EAS), and/or one or more ACR procedures to omit during migration to cloud.

ACI may be used to configure ACR detection and/or ACR execution behavior in the EEC, EES, and/or EAS. For example, the EEC, EES, and/or EAS may set one or more detection triggers and/or ACR execution rules to identify and/or perform migration to a CAS.

An ACR may be selected and/or configured for cloud. The EEC may receive the CRI from the AC. The EEC may use the CRI for ACR scenario selection. The EEC may derive and/or distribute the ACI to the EES (e.g., and/or indirectly to the EAS) for ACR scenario configuration. When the EEC selects the ACR scenarios for a user session and/or has received the CRI from the AC, the EEC may use the CRI to determine the ACI for the selected ACR scenario(s) and/or may provide the determined ACI to the EES and/or the selected EAS.

Figure 4:
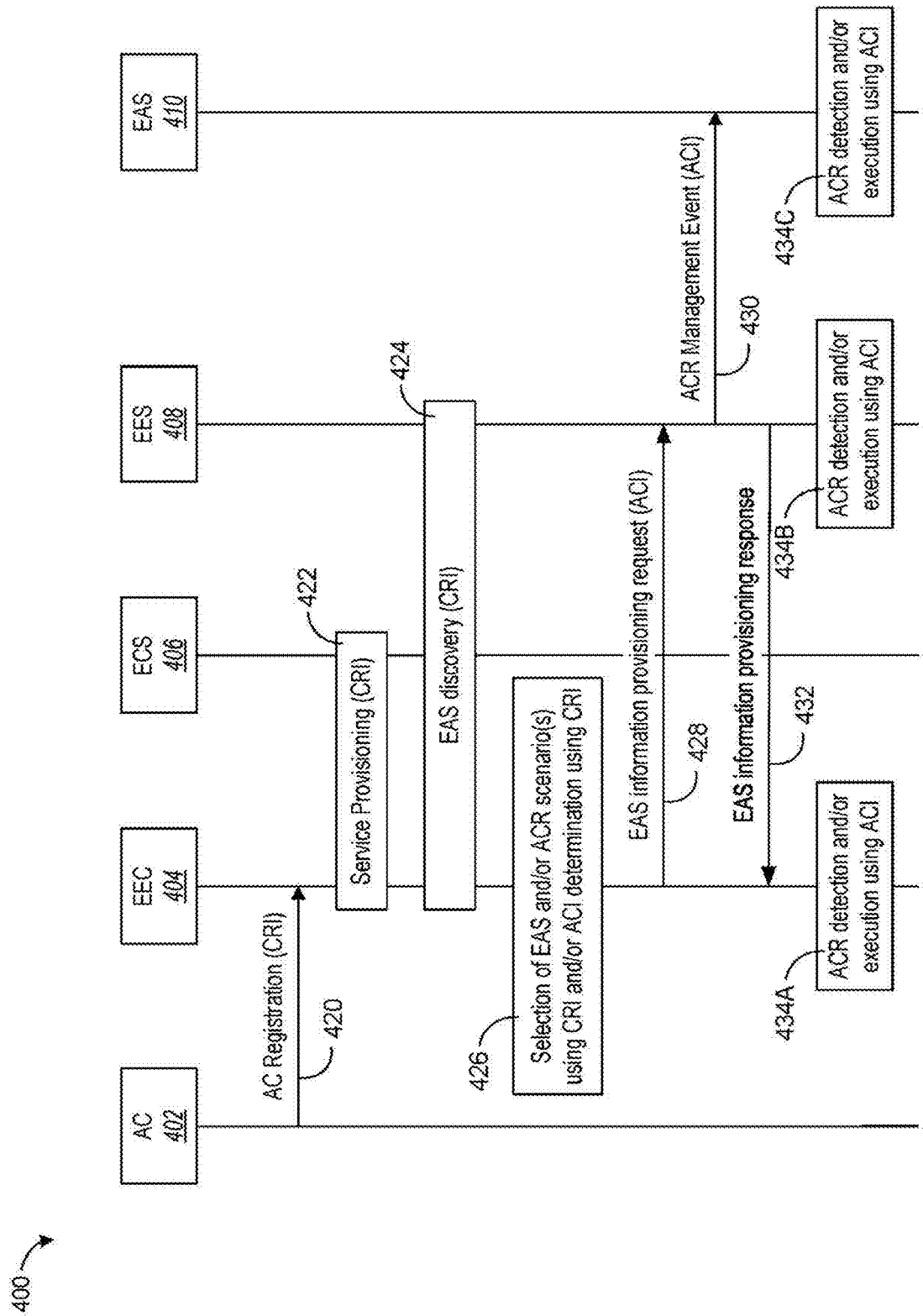
FIG. 4 illustrates a flow diagram of an example edge enabler client (EEC)-provisioned ACR configuration with cloud relocation information (CRI) provided by application client (AC).

FIG. 4 illustrates an example EEC-provisioned ACR configuration procedure 400 when CRI is provided by an AC 402. As a pre-condition, the AC 402 may have created and/or received CRI. For example, the CRI may be pre-provisioned in the AC 402 and/or received from an application server. The CRI may include CAS information, cloud migration capability of the application context, one or more conditions for relocating to the cloud, a configuration for ACR procedures, application layer capabilities associated with ACR to the cloud, and/or application layer requirements associated with ACR to the cloud.

At 420, the AC 402 may register to the EEC 404, for example, using the EDGE-5 interface. The AC 402 may include the CRI in the registration request to inform the EEC 404 about application layer capabilities and/or requirements for ACR to the cloud, and/or about CAS information. For example, the EEC 404 may obtain, at 420, CRI associated with the AC 402. The EEC 404 may determine whether a user session supports ACR to a CAS based on the CRI. Additionally or alternatively, the AC 402 may receive the CRI from an application server (AS). The AS may be, for example, running in the cloud. Interaction between the AC 402 and the AS may occur at the application layer.

At 422, the EEC 404 may perform one or more service provisioning procedures with the ECS 406 to obtain EDN configuration information and/or a list of available EESs. The EEC 404 may send a service provisioning request to the ECS 406. The service provisioning request may include the CRI, for example, to indicate to the ECS 406 that the EEC 404 desires to discover (e.g., only) EES(s) that support ACR scenarios compatible with ACR to a CAS. The ECS 406 may send a service provisioning response to the EEC 404. Upon receiving the service provisioning response, the EEC 404 may use the CRI capabilities and/or requirements to select an EES (e.g., such as EES 408) that supports ACR between edge and cloud application servers. For example, if the CRI indicates a desire to support ACR to CAS, the EEC 404 may select an EES (e.g., such as EES 408) that supports ACR scenarios compatible with ACR to a CAS. In examples, if the CRI indicates a desire for application layer CAS resolution at the AC 402, the EEC 404 may select an EES (e.g., such as EES 408) that supports ACR scenarios where the EEC 404 and/or AC 402 determine the target EAS.

At 424, the EEC 404 may perform one or more EAS discovery procedures for a user session, for example, to obtain a list of one or more available EAS instances at the selected EES 408. The EAS discovery request may include the CRI. The EES 408 may consider the CRI as a discovery filter to provide one or more EAS instances that meet the CRI capabilities and/or requirements in the EAS discovery response.

At 426, upon receiving the EAS discovery response, for example, the EEC 404 may select EAS instance(s) from the list of discovered EAS instances provided in the response. The EEC 404 may select, at 426, (e.g., according to the cloud migration capabilities of the AC 402 and/or the CRI) the one or more ACR scenarios to be used for providing service continuity to the user session. For example, cloud migration capabilities of the AC 402, the EEC 404, the selected EES 408, and/or the selected EAS 410 may be considered while selecting ACR scenarios. For example, the EEC 404 may select, at 426, the one or more ACR scenarios for the user session based on the CRI. The EEC 404 may consider the CRI capabilities and/or requirements for EAS selection and/or ACR scenario selection to select EAS (e.g., such as EAS 410) and/or ACR scenarios meeting CRI requirements. The EEC 404 may determine, based on the EAS discovery performed at 424 that there are no available target EAS (T-EAS) instances for the user session. For example, if the CRI indicates a desire to support application context migration to a CAS and/or CAS resolution at the EAS (e.g., such as EAS 410), the EEC 404 may select one or more ACR scenarios where the EES 408 and/or EAS (e.g., such as EAS 410) determines the target EAS.

The EEC 404 may derive an ACI for the selected ACR scenario(s) based on the CRI capabilities and/or requirements provided with one or more (e.g., each) selected EAS instance. The ACI may include ACR detection and/or ACR execution configuration for the EEC 404, EES 408 and/or EAS (e.g., such as EAS 410). For example, if the CRI capabilities and/or requirements indicate that CAS relocation is included within a specific service area, the EEC 404 may include in the ACI one or more (e.g., some) ACR detection triggers based on WTRU location and/or a desire for WTRU location monitoring. For example, if the CRI capabilities and/or requirements indicate CAS resolution at the AC 402, the EEC 404 may include in the ACI one or more (e.g., some) ACR execution rules to resolve CAS at the AC 402 when no T-EAS is discovered and/or available.

At 428, the EEC 404 may send an EAS information provisioning request to the EES 408. The EAS information provisioning request may include the ACI associated with the CRI (e.g., derived from the CRI capabilities and/or requirements). The EES 408 may use the ACI provided in the EAS information provisioning request to determine if ACR detection may be performed at the EES 408 and/or to configure ACR processing according to the provided ACI.

If EAS selection, at 426, selects one or more (e.g., multiple) EAS instances based on AC requirement(s), for example, the EEC 404 may provision the ACI in the EES 408 and/or the EAS (e.g., such as EAS 410) by sending one or more (e.g., multiple) EAS information provisioning requests to the same and/or one or more different EESs, and/or by sending a single EAS information provisioning request including ACI for one or more (e.g., multiple) user sessions.

At 430, the EES 408 may send an ACR management event to the selected EAS 410. The ACR management event may include the ACI derived from the CRI capabilities and/or requirements. The EAS 410 may use the ACI provided in the ACR management event to determine if ACR detection may be performed at the EAS 410 and/or to configure ACR processing according to the provided ACI.

At 432, the EES 408 may send an EAS information provisioning response to the EEC 404. For example, the EEC 404 may receive the EAS information provisioning response from the EES 408. The EAS information provisioning response may include a status of the EAS provisioning request (e.g., a result indicating if the ACI was properly provisioned).

At 434A, the EEC 404 may configure ACR detection and ACR execution according to the selected ACR scenario(s) and/or the ACI. The EEC 404 may configure ACR detection and ACR execution at any time after receiving the EAS information provisioning response from the EES 408.

At 434B, the EES 408 may configure ACR detection and/or ACR execution according to one or more ACR scenarios selected, as described herein and/or the ACI. The EES 408 may configure ACR detection and/or ACR execution (e.g., at any time) after sending the EAS information provisioning response to the EEC 404.

At 434C, the EAS 410 may configure ACR detection and/or ACR execution according to ACR scenario(s) selected, as described herein, and/or the ACI. The EAS 410 may configure ACR detection and/or ACR execution (e.g., at any time) after receiving the ACR management event from the EES 408.

An EEC may select one or more ACR scenarios using CRI provided by an EAS. If the EEC selects the ACR scenario(s) for a user session and/or the EAS provides the CRI, the EEC may use the CRI to derive the ACI at ACR scenario(s) selection, and/or may provision the ACI in the EES, and/or the selected EAS instance(s) to configure the ACR procedures performed at the EES and/or the EAS.

Figure 5:
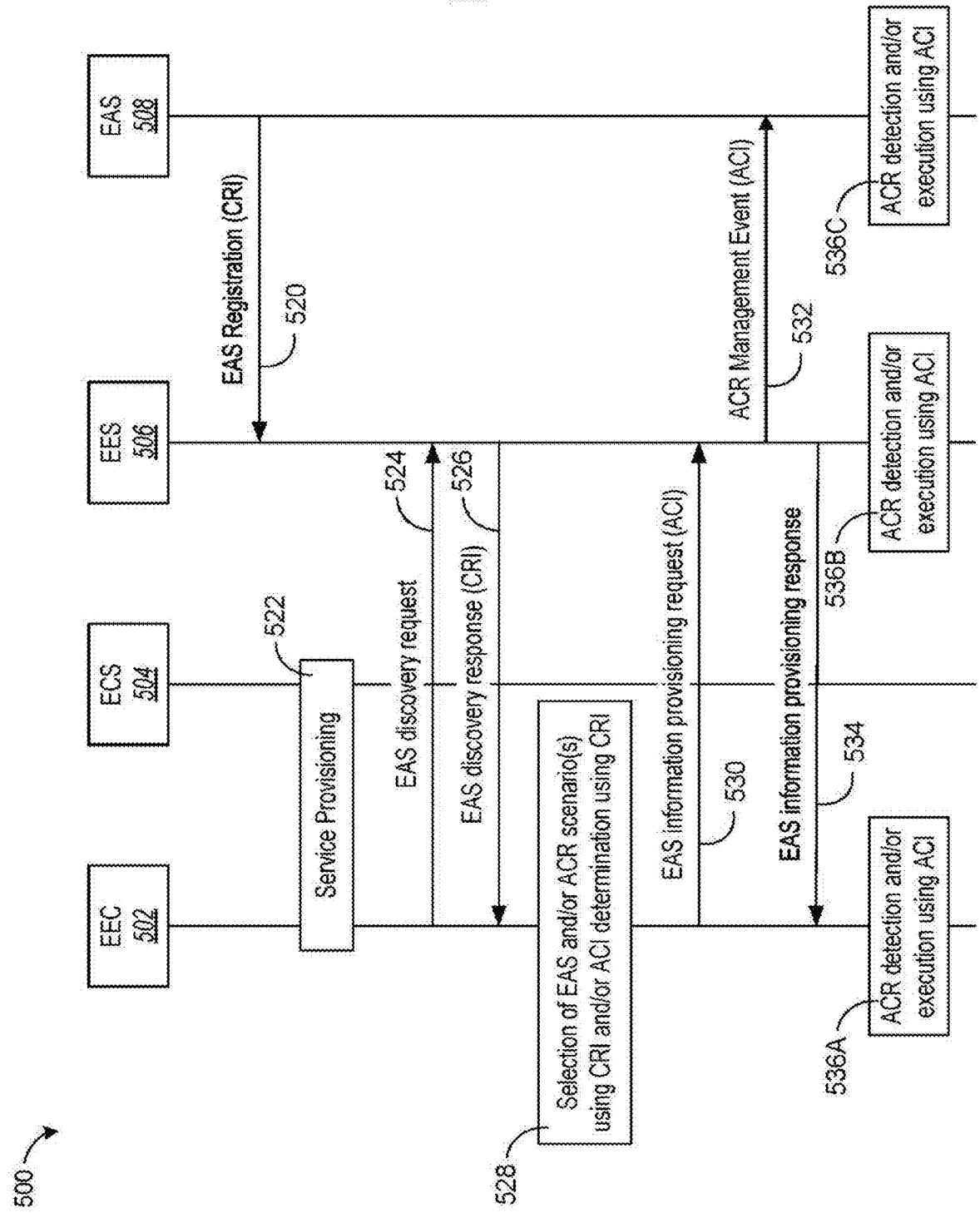
FIG. 5 illustrates a flow diagram of one or more example EEC selected ACR scenarios with CRI provided by edge application server (EAS).

FIG. 5 depicts an example procedure 500 for EEC selected ACR scenario(s) with CRI provided by an EAS 508. As a pre-condition to the example procedure for EEC selected ACR scenarios with CRI provided by an EAS 508, the EAS 508 may have created and/or obtained the CRI. For example, the CRI may be pre-provisioned in the EAS 508 and/or obtained from an application server.

At 520, the EAS 508 may register to the EES 506. The EAS 508 may include the CRI in a registration request to inform the EES 506 about the one or more application layer capabilities and/or one or more requirements for application context migration to the cloud, and/or to provide CAS information to the EEL.

At 522, the EEC 502 may perform one or more service provisioning procedures with the ECS 504, for example, to obtain EDN configuration information and/or a list of one or more available EES instances.

At 524, the EEC 502 may perform one or more EAS discovery procedures, for example, to obtain a list of one or more available EAS instances at the selected EES 506. For example, the EEC 502 may send, at 524, an EAS discovery request to the EES 506.

At 526, the EES 506 may send an EAS discovery response to the EEC 502. The EAS discovery response may include a list of one or more discovered EAS instances and/or may include CRI for one or more (e.g., each) EAS instance.

At 528, upon receiving the EAS discovery response, for example, the EEC 502 may select one or more EAS instances and/or one or more ACR scenarios to be used for service continuity of the user session. The EEC 502 may consider the one or more CRI capabilities and/or one or more requirements provided with one or more (e.g., each) EAS instance to select one or more EAS instances and/or one or more ACR scenarios that support ACR between edge and cloud application servers. For example, if the CRI indicates a desire to support application context migration to a CAS and/or CAS resolution at the AC, the EEC 502 may select, at 528, one or more ACR scenarios where the EEC 502 and/or AC determines the T-EAS.

The EEC 502 may derive an ACI for the selected ACR scenario(s) based on the one or more CRI capabilities and/or requirements provided with one or more (e.g., each) selected EAS instance. The ACI may include ACR detection and/or ACR execution configuration for the EEC 502, EES 506, and/or EAS 508. For example, if the one or more CRI capabilities and/or requirements indicate that CAS relocation is required within a specific service area, the EEC 502 may include in the ACI one or more (e.g., some) ACR detection triggers based on WTRU location. For example, if the one or more CRI capabilities and/or requirements indicate that CAS relocation is required within a specific service area, the EEC 502 may include in the ACI a desire for WTRU location monitoring. For example, if the one or more CRI capabilities and requirements indicate CAS resolution at the AC, the EEC 502 may include in the ACI one or more (e.g., some) ACR execution rules to resolve CAS at the AC when no T-EAS is discovered and/or available.

The EEC 502 may provision the ACI in the EES and/or EAS to configure ACR detection and/or execution. At 530, the EEC 502 may send an EAS information provisioning request (e.g., that includes the ACI) to the EES 506. At 532, the EES 506 may send an ACR Management Event (e.g., that includes the ACI) to the EAS 508. At 534, the EES 506 may send an EAS information provisioning response to the EEC 502.

At 536A, the EEC 502 may configure ACR detection and/or ACR execution according to ACR scenario(s) selected, as described herein, and/or the ACI. The EEC 502 may configure ACR detection and/or ACR execution (e.g., at any time) after receiving the EAS information provisioning response from the EES 506.

At 536B, the EES 506 may configure ACR detection and/or ACR execution according to one or more ACR scenarios selected, as described herein and/or the ACI. The EES 506 may configure ACR detection and/or ACR execution (e.g., at any time) after sending the EAS information provisioning response to the EEC 502.

At 536C, the EAS 508 may configure ACR detection and/or ACR execution according to ACR scenario(s) selected, as described herein and/or the ACI. The EAS 508 may configure ACR detection and/or ACR execution (e.g., at any time) after receiving the ACR management event from the EES 506.

An EES may be configured to select one or more ACR scenarios using CRI provided by an EAS. The EES may receive the CRI from an EAS. The EES may use the CRI for ACR scenario selection. The EES may derive and/or distribute the ACI to the EEC and/or EAS for ACR scenario configuration.

If the EES selects the one or more ACR scenarios for a user session and/or the EAS provides the CRI, the EES may use the CRI to derive an ACI at one or more ACR scenarios selection and/or may provision the ACI in the EEC and/or the selected one or more EAS instances to configure the ACR procedure performed at the EEC and/or EAS.

Figure 6:
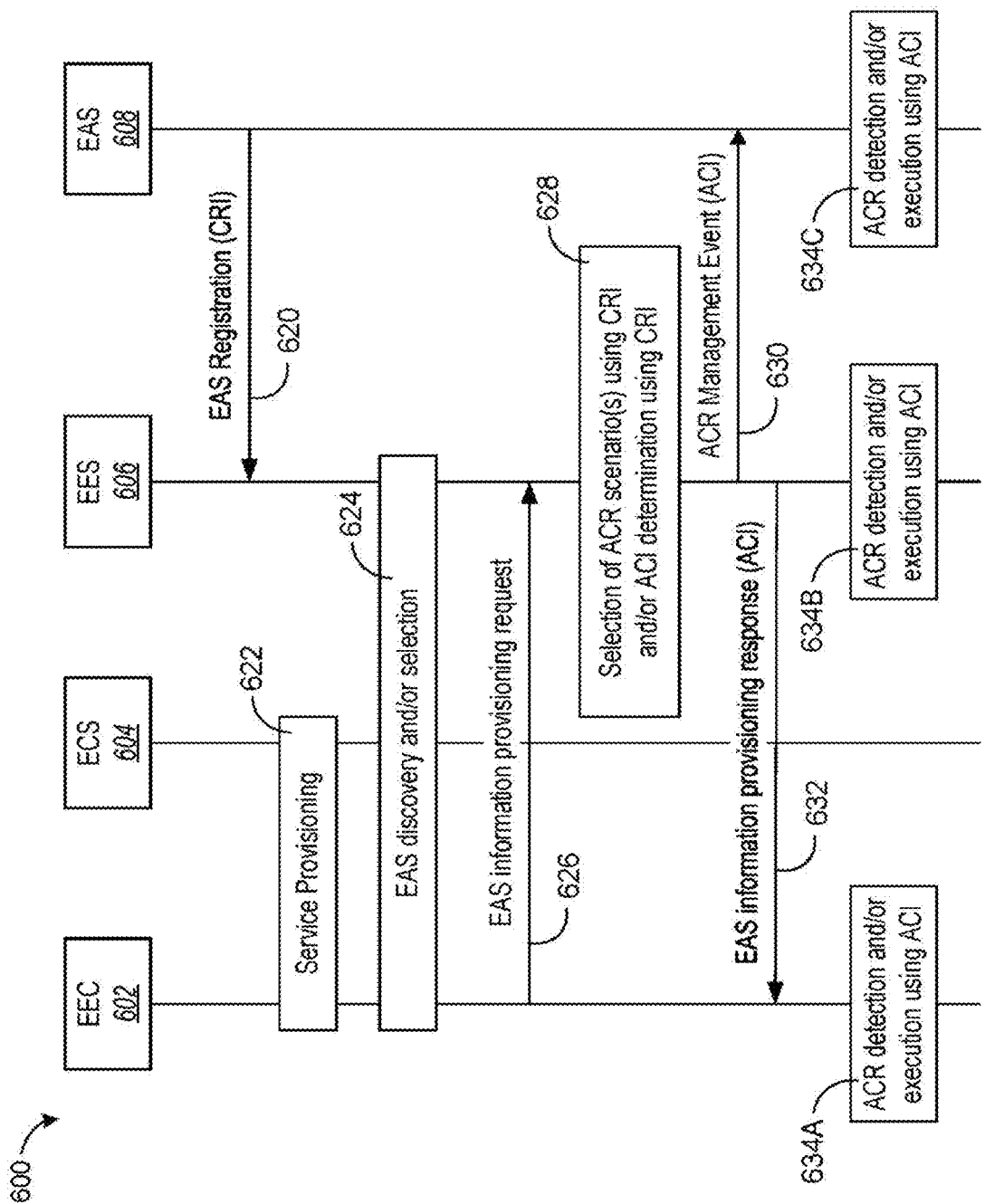
FIG. 6 illustrates a flow diagram of one or more example edge enabler server (EES) selected ACR scenarios with CRI provided by EAS.

FIG. 6 illustrates an example procedure 600 for EES selected ACR scenario(s) with CRI provided by an EAS 608. As a pre-condition, for example, the EAS 608 may have created and/or obtained the CRI. For example, the CRI may be pre-provisioned in the EAS 608 and/or obtained from an application server.

At 620, the EAS 608 may register to the EES 606. The EAS 608 may include the CRI in the registration request to inform the EES 606 about the one or more application layer capabilities and/or requirements for application context migration to the cloud, and/or to provide CAS information to the EEL.

At 622, the EEC 602 may perform one or more service provisioning procedures with the ECS 604, for example, to obtain EDN configuration information and a list of one or more available EES instances.

At 624, the EEC 602 may perform one or more EAS discovery procedures with the selected EES 606 to obtain a list of one or more available EAS instances. Upon receiving the EAS discovery response, for example, the EEC 602 may select one or more EAS instances for the user session.

At 626, the EEC 602 may send an EAS information provisioning request to the EES 606. The EAS information provisioning request may indicate that the EES 606 desires to select the one or more EAS instances (e.g., if not selected as described herein) and/or may select the one or more ACR scenarios for the user session.

At 628, upon receiving the EAS information provisioning request, for example, the EES 606 may select the one or more EAS instances and/or may select one or more ACR scenarios to be used for service continuity of the user session. The EES 606 may consider the one or more CRI capabilities and/or requirements obtained during EAS registration to select one or more EAS instances and/or one or more ACR scenarios that support ACR between edge and one or more cloud application servers. For example, if the CRI indicates a desire to support application context migration to a CAS and/or CAS resolution at the AC, the EES 606 may select, at 628, one or more ACR scenarios where the EEC 602 and/or AC determines the target EAS.

The EES 606 may derive an ACI for the selected ACR scenario(s) based on the one or more CRI capabilities and/or requirements provided with each selected EAS instance. The ACI may include ACR detection and/or ACR execution configuration for the EEC 602, EES 606, and/or EAS 608. For example, if the one or more CRI capabilities and/or requirements indicate that CAS relocation is included within a specific service area, the EEC 602 may include in the ACI one or more (e.g., some) ACR detection triggers based on WTRU location and/or a desire for WTRU location monitoring. For example, if the one or more CRI capabilities and/or requirements indicate CAS resolution at the AC, the EEC 602 may include in the ACI one or more (e.g., some) ACR execution rules to resolve CAS at the AC when no T-EAS is discovered and/or available.

At 630, the EES 606 may send an ACR management event to the selected EAS 608. The ACR management event may include the ACI to inform the EAS 608 about how to configure ACR processing according to the provided ACI.

At 632, the EES 606 may send an EAS information provisioning response to the EEC 602. The EAS information provisioning response may include the ACI to inform the EEC 602 about how to configure ACR processing according to the provided ACI.

At 634A, the EEC 602 may configure ACR detection and/or ACR execution according to one or more ACR scenarios selected, as described herein and/or the ACI. The EEC 602 may configure ACR detection and/or ACR execution (e.g., at any time) after receiving the EAS information provisioning response from the EES 606.

At 634B, the EES 606 may configure ACR detection and/or ACR execution according to one or more ACR scenarios selected, as described herein and/or the ACI. The EES 606 may configure ACR detection and/or ACR execution (e.g., at any time) after sending the EAS information provisioning response to the EEC 602.

At 634C, the EAS 608 may configure ACR detection and/or ACR execution according to one or more ACR scenarios selected, as described herein and/or the ACI. The EAS 608 may configure ACR detection and/or ACR execution (e.g., at any time) after receiving the ACR management event from the EES 606.

ACR may be configured, detected, and/or executed for cloud. One or more ACR procedures may expect EEL support in (e.g., both) the source and/or target Edge Data Network. Therefore, supporting ACR to a cloud with insufficient (e.g., no) EEL support may include an ACR procedures configuration that alters operation of one or more ACR procedures for cloud migration. ACR configuration may be distributed to one or more ACR detection entities and/or one or more ACR execution entities (e.g., EEC, EES, EAS, etc.). The ACR configuration may be used at the one or more ACR detection entities and/or the one or more execution entities.

A WTRU (e.g., such as an EEC) may perform one or more of the following actions for configuring and/or executing an ACR for cloud relocation. The WTRU may select one or more ACR scenarios to perform service continuity for an AC of the WTRU and/or an EAS that has been discovered. The ACR scenario selection may be based on ACI information and/or service continuity capabilities of the AC, EEC, EES, and/or EAS. A WTRU may send an EAS information provisioning request to the EES. The EAS information provisioning request may indicate the selected ACR scenarios and/or provide the ACI information. The WTRU may receive an EAS information provisioning response indicating that the provisioned information has been accepted by the EES. On the condition that the selected ACR scenario requires ACR detection at the EEC and/or that ACI indicates a capability to perform ACR with the cloud, the WTRU may include information about cloud servers and/or may include one or more conditions (e.g., ACR detection conditions) for migrating to the cloud. The WTRU may initiate ACR detection at the EEC. The detection condition(s) may include detecting that an ACR is required based on the one or more conditions and/or triggers provided in the ACI. On the condition that an ACR condition is detected, the WTRU may evaluate if an ACR to the cloud is required. For example, the WTRU may detect if a target EAS is available and/or evaluate one or more cloud migration rules provided in the ACI.

When a need for ACR has been detected, for example, the WTRU may determine if an ACR to the cloud is required based on the ACI (e.g., if there is no T-EAS available and/or if one or more other cloud migration rules have been triggered). The WTRU may send an ACR request to the EES that indicates that a migration to the cloud is required (e.g., if one of the ACR conditions is met and/or if one or more of the triggers is received or identified). When a cloud migration rule is triggered and/or an ACR condition is met, the WTRU may send an ACR request to the EES. The ACR request may indicate that a migration to the cloud is required. Additionally or alternatively, the selected ACR scenario may require ACR detection at the EES and/or EAS.

The EEC, EES, and/or EAS may use the ACI for ACR scenario configuration. The ACI may be used during ACR detection and/or ACR execution to enable application context migration between edge and cloud application servers. A WTRU may perform ACR detection and/or execution using ACI. After ACI provisioning, for example, the EEC, EES, and/or EAS may have sufficient information to configure the ACR detection triggers to initiate ACR to the cloud; the EEC, EES and EAS also have sufficient information to determine the actions needed during ACR execution to migrate an application context between edge and cloud application servers.

Figure 7:
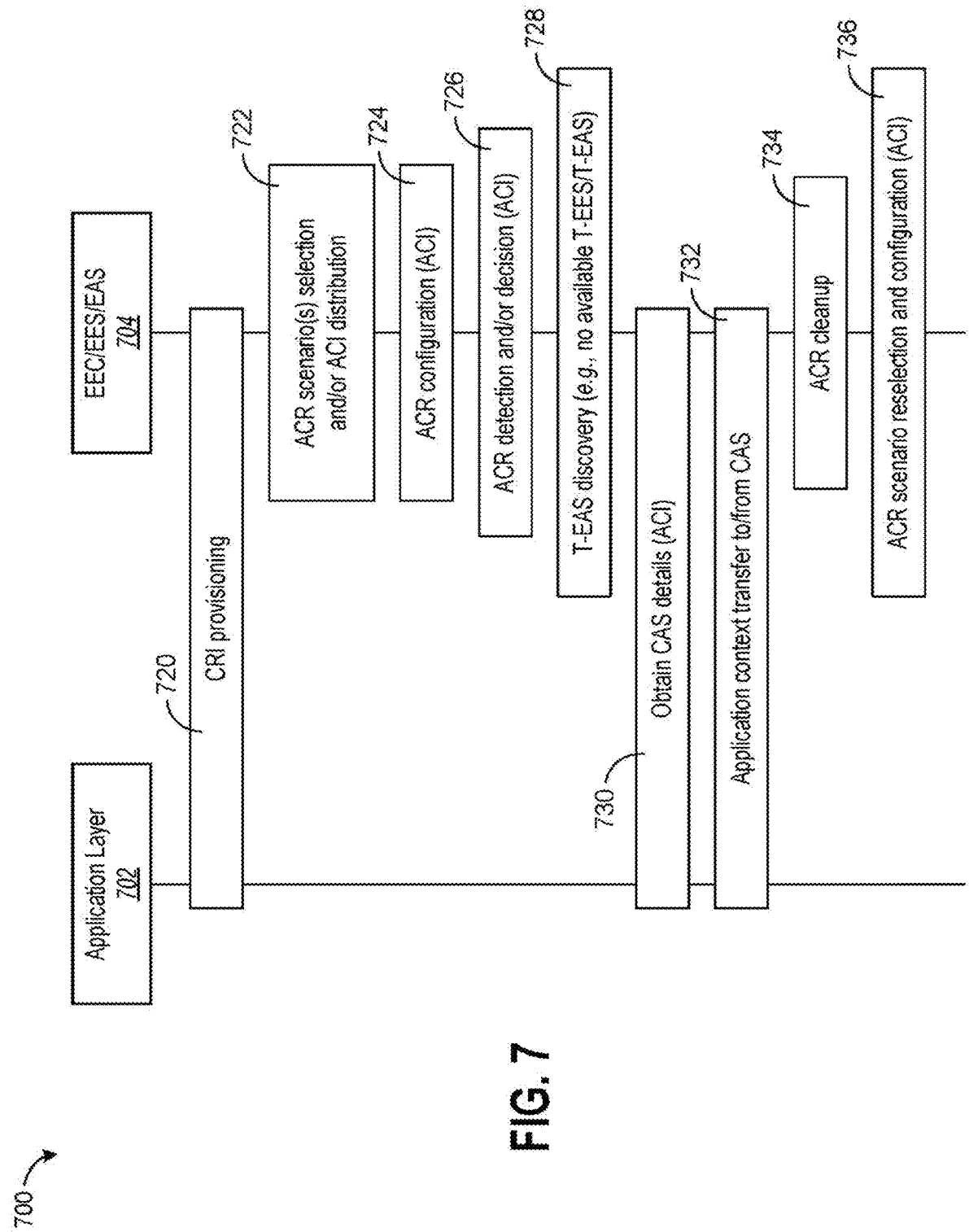
FIG. 7 illustrates a flow diagram of an example ACR detection, ACR execution, and/or ACR scenario reselection using ACI.

FIG. 7 illustrates an example ACR detection, ACR execution, and/or ACR scenario reselection 700 using ACI. For example, one or more responsibilities may be distributed between the application layer 702 and the EEC, EES, and/or EAS 704 for configuration, detection, and/or execution of ACR for cloud, and/or ACR scenario reselection using the ACI.

At 720, the application layer 702 may have provisioned the CRI in the EEC and/or EES. The CRI may be associated with an application context. Additionally or alternatively, the CRI may have been pre-provisioned, at 720, in the EEC and/or EAS. For example, the EEC may obtain CRI associated with an application context. The EEC and/or EES may have selected an EAS and/or one or more ACR scenarios for a user session. The EEC and/or EAS may have derived an ACI from the CRI and/or may have distributed the ACI to the one or more ACR detection entities (e.g., EEC, EES, and/or EAS) and/or ACR execution entities (e.g., EEC, EES, and/or EAS).

At 722, the one or more ACR detection entities 704 may receive the ACI from the EEC and/or EES. The ACI may include CRI that indicates CAS information, application layer capabilities, and/or application layer requirements. CAS information may include an IP address, FQDN, URI, DNN, DNAI, and/or SNSSAI to reach the CAS. At 724, the one or more ACR detection entities 704 may configure ACR detection and/or ACR execution rules using the ACI. The one or more ACR detection entities 704 (e.g., EEC, EES, and/or EAS) may determine whether the user session supports ACR to a CAS using the ACI. The one or more configured detection triggers may include triggers from the ACR detection criteria in the ACI. For example, ACR detection criteria may require the EEC and/or EES to monitor the WTRU location and/or to trigger application context migration to a CAS if the WTRU moves into a location where CAS connectivity is preferred and/or where edge connectivity is not permitted for the application. For example, the detection criteria may require the one or more ACR detection entities to trigger application context migration to a CAS based on one or more SLA thresholds such as edge service KPIs and/or edge usage limits being reached.

At 726, the one or more ACR detection entities 704 may detect a desire for ACR according to the ACI detection triggers configured for ACR with cloud, and/or may determine to proceed with ACR execution. For example, the one or more ACR detection entities 704 may determine that one or more of the ACI detection triggers may be triggered. For example, wherein a change in location of the WTRU (e.g., the EEC) may trigger a need to change EAS.

At 728, the one or more ACR execution entities may perform one or more EAS discovery procedures and/or may find no available T-EAS instance for the user session. For example, at 728, a WTRU (e.g., the EEC) may perform an EAS discovery procedure for a user session. For example, the WTRU may move to a location where there is no target EDN, EES, and/or EAS that meets the user session requirements.

If ACR was triggered using ACR detection criteria from the ACI, for example, the ACR execution configuration from the ACI may require that the EAS discovery procedure be skipped (e.g., entirely) and/or that the T-EAS obtained from EAS discovery should be ignored. For example, if the ACR detection configuration from the ACI indicates a cloud relocation is required within a designated service area, for example, a WTRU entering this service area may trigger ACR execution for the user session, and/or the ACR execution configuration from the ACI may require the ACR execution entity to skip T-EAS discovery and/or (e.g., immediately) continue with ACR to cloud.

The WTRU (e.g., the EEC) may determine, based on the EAS discovery procedure, that there are no available target EAS (T-EAS) instances for the user session. For example, the WTRU may determine that the there are no available T-EAS instances for the user session based on one or more of an ACR trigger in the ACI or the WTRU moving to a location where no T-EAS instances meet requirements associated with the user session. If EAS discovery returns no available T-EAS instance and/or if the user session and/or the triggered ACR scenario does not support application context migration to a CAS, ACR scenario execution may terminate and/or begin ACR cleanup. The one or more ACR execution entities may use the provisioned CRI capabilities to determine whether the user session supports context migration to a CAS.

At 730, the EEC, EES, and/or EAS 704 may obtain one or more CAS details (e.g., CAS IP address, DNN and/or DNAI) for establishing connectivity with the CAS. The CAS details may be obtained using the ACI. The CAS endpoint information may be included in the ACI, and/or may include the EEC, EES, and/or EAS to perform an endpoint resolution procedure to obtain CAS endpoint information. The EEC, EES and/or EAS may use the CAS resolution mode from the ACI to determine whether the CAS endpoint information can be resolved (e.g., respectively) by the EEC, EES, and/or EAS and/or can be resolved by the application layer. When CAS endpoint resolution is performed by the EEC, EES, and/or EAS, for example, the EEC, EES and/or EAS may use the CAS FQDN and/or URI from the CAS information in the ACI to perform DNS resolution. For example, the EEC may perform DNS resolution for the CAS based on the ACI. If CAS endpoint resolution is configured to run at the application layer, for example, the EEC, EES, and/or EAS may invoke an endpoint provided by an application that may have subscribed to the EEC, EES, and/or EAS to notify the application that CAS resolution is included at the application layer. The notification may include the CAS endpoint information to be resolved, and/or may include (e.g., any) ACI information for the user session migrating to the cloud. The application may resolve the CAS endpoint information and/or provide this information to the EEC, EES, and/or EAS in the notification response and/or by using one or more CRI provisioning procedures. Additionally or alternatively, the application may determine that a different CAS endpoint may be used (e.g., instead).

When the selected target is a CAS, for example, the selection entity (e.g., EEC, EES and/or EAS) may inform one or more other ACR execution entities about the decision to migrate the application context to a CAS. This may be achieved using one or more (e.g., enhanced) ACR procedures that include a CAS Profile. A CAS Profile may include CAS information and/or may be similar to an EAS Profile with an indication that the profile is for CAS. For example, a CAS Profile may be included in the target information notification sent from the S-EES to the EEC. For example, the CAS Profile may be included in the selected target EAS declaration request sent from the S-EAS to the EES.

At 732, ACR execution may transfer the user session context between edge and one or more cloud application servers based on, for example, the ACR execution configuration and/or CAS information available in the ACI. The WTRU (e.g., an application context on the EEC) may establish a connection with the CAS based on the ACI. The WTRU (e.g., the EEC may initiate the transfer of the user session context from an EAS to a CAS based on the ACI. When the transfer is complete, for example, the one or more ACR scenario cleanup procedures may be performed, at 734. During the ACR cleanup, the EEC, EES, and/or EAS 704 may determine that one or more (e.g., certain) procedures may be skipped if the ACR target is a CAS (e.g., CAS Profile may be used to determine that the target is a CAS).

At 736, the EEC and/or EES may (re) evaluate if the selected ACR scenarios should be updated. The one or more CRI capabilities and/or requirements may be used to determine the one or more ACR scenarios to select. The one or more selected ACR scenarios may change and/or may be provisioned in the EEC, EES, and/or EAS 704. For example, after migrating an application context from an EAS to a CAS, the one or more selected ACR scenarios may be limited to the 'EEC executed ACR via T-EES' scenario, for example, because this scenario may have no dependency on an EES that may not be available in a cloud environment.

What is claimed is:

1. A wireless transmit/receive unit (WTRU) comprising:
a processor configured to:
perform a procedure;
determine, via an edge enabler client (EEC) of the WTRU, that there is no available target Edge Enabler Server (T-EES) based on the procedure;
determine, via the EEC of the WTRU, to perform application context relocation (ACR) to a cloud application server (CAS) based on ACR to the CAS being supported, wherein the EEC was provisioned with ACR configuration information (ACI), and wherein the ACI comprises CAS information;
perform, via the EEC of the WTRU, domain name system (DNS) resolution for the CAS based on the ACR to the CAS being supported; and
send a notification to a source EES indicating that the ACR to the CAS has been initiated, wherein the notification comprises a CAS address obtained from the DNS resolution of the CAS.

2. The WTRU of claim 1, wherein the procedure comprises a service provisioning procedure.

3. The WTRU of claim 2, wherein the processor is configured to determine that there are no available T-EES based on the service provisioning procedure.

4. The WTRU of claim 1, wherein the notification comprises a Universal Resource Identifier (URI) obtained from the DNS resolution of the CAS.

5. The WTRU of claim 1, wherein the notification comprises a Fully Qualified Domain Name (FQDN) obtained from the DNS resolution of the CAS.

6. The WTRU of claim 1, wherein the notification comprises a Data Network Access Identifier (DNAI) associated with a target edge application server (T-EAS).

7. The WTRU of claim 1, wherein the processor is configured to determine, via the EEC of the WTRU, that ACR to the CAS is supported based on the CAS information.

8. The WTRU of claim 1, wherein the processor is configured perform the procedure based on a change in location of the WTRU.

9. The WTRU of claim 1, wherein the processor is configured to establish a connection with the CAS.

10. The WTRU of claim 1, wherein the processor is configured to perform the DNS resolution for the CAS based on there being no available target T-EES and based on ACR to the CAS being supported.

11. A method performed by a wireless transmit/receive unit (WTRU), the method comprising:
performing a procedure;
determining, via an edge enabler client (EEC) of the WTRU, that there is no available target Edge Enabler Server (T-EES) based on the procedure;
determining, via the EEC of the WTRU, to perform application context relocation (ACR) to a cloud application server (CAS) based on ACR to the CAS being supported, wherein the EEC was provisioned with ACR configuration information (ACI), and wherein the ACI comprises CAS information;
performing, via the EEC of the WTRU, domain name system (DNS) resolution for the CAS based on ACR to the CAS being supported; and
sending a notification to a source EES indicating that the ACR to the CAS has been initiated, wherein the notification comprises a CAS address obtained from the DNS resolution of the CAS.

12. The method of claim 11, wherein the procedure comprises a service provisioning procedure.

13. The method of claim 12, further comprising:
determining that there are no available T-EES based on the service provisioning procedure.

14. The method of claim 11, wherein the notification comprises a Universal Resource Identifier (URI) obtained from the DNS resolution of the CAS.

15. The method of claim 11, wherein the notification comprises a Fully Qualified Domain Name (FQDN) obtained from the DNS resolution of the CAS.

16. The method of claim 11, wherein the notification comprises a Data Network Access Identifier (DNAI) associated with a target edge application server (T-EAS).

17. The method of claim 11, further comprising determining, via the EEC of the WTRU, that ACR to the CAS is supported based on the CAS information.

18. The method of claim 11, further comprising:
performing the procedure based on a change in location of the WTRU.

19. The method of claim 11, further comprising:
establishing a connection with the CAS.

20. The method of claim 11, further comprising:
performing the DNS resolution for the CAS based on there being no available target T-EES and based on ACR to the CAS being supported.

* * * * *